July 7, 1964  K. IRMSCHER  3,140,302
11-KETO-12-DEHYDRO-STEROIDS AND METHOD FOR THEIR PREPARATION
Filed July 5, 1962

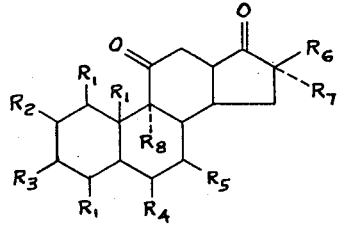

WHEREIN:

$R_1$ = H or $CH_3$ $R_2$ = H, OH, $CH_3$ or $OCH_3$ $R_3$ = O, OH, O-Alkyl or O-Acyl $R_4$ = H, $CH_3$, OH, Cl, F or =O $R_5$ = H, OH, =O $R_6$ = H or OH $R_7$ = H, OH, Cl, $CH_3$ or JOINTLY WITH $R_6$ =O $R_8$ = H or F

FIG. 1

REACTION MECHANISM II

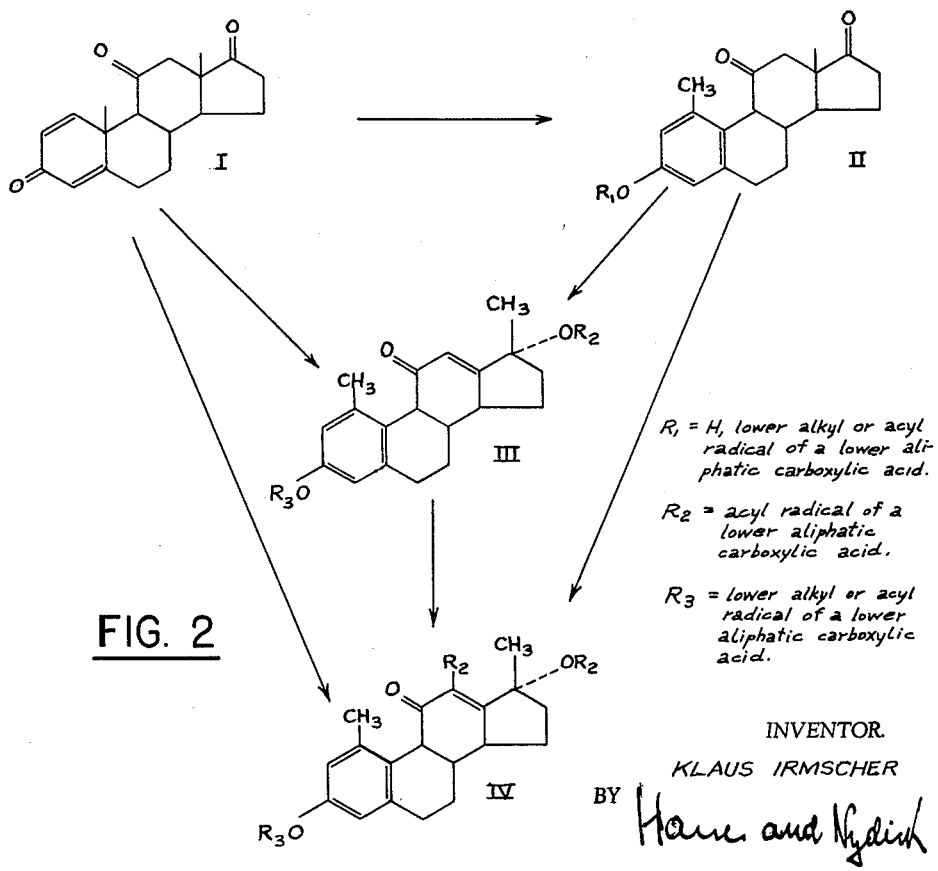

$R_1$ = H, lower alkyl or acyl radical of a lower aliphatic carboxylic acid.

$R_2$ = acyl radical of a lower aliphatic carboxylic acid.

$R_3$ = lower alkyl or acyl radical of a lower aliphatic carboxylic acid.

FIG. 2

INVENTOR.
KLAUS IRMSCHER
BY Hann and Hydink
ATTORNEYS

United States Patent Office 3,140,302
Patented July 7, 1964

3,140,302
11-KETO-12-DEHYDRO-STEROIDS AND METHOD FOR THEIR PREPARATION
Klaus Irmscher, Darmstadt, Germany, assignor to E. Merck Aktiengesellschaft, Darmstadt, Germany, a corporation of Germany
Filed July 5, 1962, Ser. No. 207,753
Claims priority, application Germany July 6, 1961
13 Claims. (Cl. 260—397.45)

The present invention relates to a new method by which 11,17-diketo-steroids can be converted by a rearrangement reaction with simultaneous acylation into $\alpha,\beta$-unsaturated 11-keto-steroids; and the novel products resulting therefrom.

It has been found that a series of $\alpha,\beta$-unsaturated 11-keto steroids can be prepared by reacting a 13$\beta$-methyl-11,17-diketo-steroid, in the presence of a strong acid, with a lower aliphatic carboxylic anhydride. In this way, there are produced a 17-$\beta$-methyl-17$\alpha$-acyloxy-11-keto-12-ene-steroid, as well as the corresponding 17$\beta$-methyl-17$\alpha$-acyloxy-12-acyl-11-keto-12-ene-steroid. The 17-$\beta$-methyl-17-$\beta$-acyloxy-11-keto-12-ene-steroid produced is separated from the reaction by customary methods, as for instance, by chromatography or crystallization. The other reaction products can be isolated as pure substances and/or can be converted, possibly by further treatment with a low molecular weight aliphatic carboxylic anhydride and a strong acid, also into the corresponding 17$\beta$-methyl-17$\alpha$-acyloxy-11-keto-12-ene-steroid. The acid concentration should be between 0.1 and 5% (referred to the carboxylic acid anhydride). In general, the mol ratio of the steroid starting material to the anhydride is approximately about 1:3 to 1:3000 whereby the preferred range is from 1:50 to 1:1000.

As a lower aliphatic carboxylic acid anhydride, which acts as solvent and acylating agent in the method of the invention there can be also used, in addition to acetic anhydride, for instance, propionic or butyric anhydride or a mixed acid anhydride. As a strong acid, perchloric acid is particularly suitable. The reaction begins as soon as the reaction solution is set up at room temperature. The reaction times are, in general, between 2 and 20 hours. By heating the reaction mixture, the reaction time can possibly be shortened. It is necessary to select for the method, in accordance with the invention, and acid concentration of at least 0.1% (referred to the acid anhydride), since otherwise the final products are no longer produced in acceptable yields.

When using, for instance, 1-dehydro-adrenosterone as the starting material, there is obtained, in case of a lower acid concentration only the customary dienone-phenol rearrangement, without the final products of the method of the invention being formed to any substantial extent. Only with acid concentrations of more than, i.e., at least 0.1%, and preferably between 0.5 and 1.5%, does the transformation to the desired end products take place in a sufficient yield, in which connection any dienone-phenol rearrangement product, which may have been formed as an intermediate stage, is converted into the final products in accordance with the method of the invention. In general, the yields drop again at acid concentrations of more than 5%, so that on the whole, a concentration range of 0.1 to 5% of acid is most advantageous for the method of the invention. It has been found particularly favorable to use for the new method acetic anhydride as the aliphatic carboxylic anhydride and perchloric acid as a strong acid.

The method in accordance with the invention can be characterized by the following reaction mechanism I:

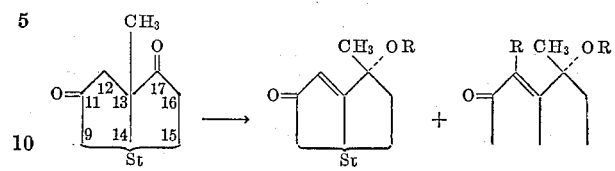

$R$=acyl radical of a lower aliphatic carboxylic acid.
$St$=the steroid residue of the androstane or estrane series.

The previously unknown $\alpha,\beta$-unsaturated 11-keto-steroids in accordance with the invention are produced by an entirely new and surprising rearrangement. The 13$\beta$-methyl group of the starting material travels to the position of the 17-keto group so that a $\beta$-methyl- and an $\alpha$-o-acyl group are located at this point after the reaction. At the same time, due to this rearrangement, a double bond is formed in conjugation to the carbonyl group present in 11-position. The 17$\beta$-methyl-17$\alpha$-acyloxy-11-keto-12-ene-steroids obtained in this manner can be separated form the resultant crude product by customary methods, as for instance, by chromatography, extraction, crystallization, etc.

Among the compounds remaining in the residue after the separating of the 17$\beta$-methyl-17$\alpha$-acyloxy-11-keto-12-ene-steroid from the reaction mixture, there is contained the corresponding 17$\beta$-methyl-17$\alpha$-acyloxy-12-acyl-11-keto-12-ene-steroid, the constitution of which was derived from the following data:

(1) In accordance with the analytical values and the nuclear resonance spectrum, this compound contains one acyl group more (nuclear resonance line for acetyl at $\tau\sim7.65$) than the 17$\beta$-methyl-17$\alpha$-acyl-11-keto-12-ene-steroid also produced by the method of the invention.

(2) The compound contains in accordance with the nuclear resonance spectrum no hydrogen atoms on an olefin double bond, insofar as they were not already present in the starting material.

(3) The ultraviolet absorption exhibits a maximum at $\lambda_{max}$ 243–244 m$\mu$ with an extinction of $\epsilon\sim24,000$.

(4) In the infrared spectrum, there are characteristic bands at about 1745 and 1660 $_{cm.-1}$.

(5) The band of the angular 13$\beta$-methyl group of the starting material is displaced in the same direction in the nuclear resonance spectrum as in the 17$\beta$-methyl-17$\alpha$-acyloxy-11-keto-1-ene-steroid also obtained in accordance with the invention and is located at $\tau\sim8.9$.

(6) The substance, in the same way as the 17$\beta$-methyl-17$\alpha$-acyloxy-11-keto-12-ene-steroid obtained at the same time also contains in the nuclear resonance spectrum a line with an acyl band (for acetyl at $\tau\sim7.7$).

Insofar as this is desired, it is possible by further treatment with a carboxylic acid anhydride in the presence of a strong acid to convert this 12-acyl-11-keto-steroid also into the corresponding 17$\beta$-methyl-17$\alpha$-acyloxy-11-keto-12-ene-steroid.

Preferred starting materials for the method of the invention are 1-dehydro-adrenosterone, 1-methyl-11-oxo-estrone, as well as its 3-acylate or its lower 3-alkyl esters, as well as adrenosterone.

Of course, the method of the invention can also be carried out with other starting materials. Thus, for instance, in general, 11,17-diketosteroids of the androstane or estrane series can be used in the reaction. These compounds can contain different substituents and/or double bonds. They can be characterized by the general formula shown in FIG. 1 of the accompanying drawing.

These compounds may furthermore possess double bonds, as for instance, in the 1-, 3-, 4-, 5-, 5(10)- and 6-positions. Compounds of this type are described, for example, in U.S. Patents 2,867,630, 2,899,447 and 2,946,812, as well as in Belgian Patent 600,036.

If 1-dehydro-adrenosterone or a 3-acylate or a 3-alkyl ether of 1-methyl-11-oxo-esterone is used as the starting material for the method of the invention, the reaction can be represented by the reaction mechanism II shown in FIG. 2 of the accompanying drawing.

From the reaction mechanism II, it is evident that both compound I and compound II can be transformed into a 3-acylate or a 3-alkyl ether respectively of 1,17β-dimethyl-18-nor-1,3,5(10),12-estratetraene-11-one-3, 17α-diol-17-acylate (III) and 1,17β-dimethyl-12-acyl-18-nor-1,3,5(10),12-estratetraene IV. Since compound II can be obtained by a dienone-phenol rearrangement from compound I, the latter (compound I) can be converted via compound II, as an intermediate product, into the two final products by the method of the invention. In this case, however, $R_3$ in compound III can only be an acyl radical. If one, however, proceeds directly from compound II, then both 1-methyl-11-oxo-estrone itself as well as its 3-acylate or 3-alkyl ether can be used as starting material so that in this case the final product III contains in the 3-position either a lower alkyl or a lower aliphatic acid carboxylic acid radical. As lower alkyl radicals, methyl-, ethyl-, propyl-, n-butyl- and tert. butyl radicals are particularly suitable. The lower aliphatic carboxylic acid radicals contain preferably up to 4 carbon atoms, such as the acetoxy-, propionyloxy-or butyryloxy radical.

From the reaction mechanism II, it is furthermore evident that the 12-acyl-11-keto-steroid IV can also be converted by further treatment with a carboxylic anhydride and a strong acid into compound III. The steroid IV, after the separation of compound III, can possibly also be still present in the reaction product together with compound II, present either as unchanged starting material or as intermediate products. The two compounds can be converted—with or without separation from each other—into compound III under the reaction conditions indicated.

Further conversions customary in steroid chemistry can also be carried out on the intermediate or final products obtained by the method of the invention. Thus, for instance, any acyloxy groups present can be saponified and hydroxyl groups can be converted into acyloxy groups or oxidized into keto groups. Furthermore, double bonds, particularly in 1,2-position, can be introduced by all customary chemical and microbiological dehydrogenation methods.

By the method of the present invention, the following compounds can, for instance, be produced:

1,17β-dimethyl-18-nor-1,3,5(10),12-estratetraene-3, 17α-diol-11-one-diacetate,
17β-methyl-18-nor-3,5,12-androstatriene-3,17α-diol-11-one-diacetate,
17β-methyl-18-nor-4,12-androstadiene-17α-ol-3,11-dione-acetate,
9α-fluoro-17β-methyl-18-nor-4,12-androstadiene-17α-ol-3,11-dione-acetate,
9α-fluoro-17β-methyl-18-nor-1,4,12-androstatriene-17α-ol-3,11-dione-acetate,
17β-methyl-18-nor-1,4,12-androstatriene-17a-ol-3,11-dione-acetate, as well as the corresponding compounds which also contain in 12-position an acyl group, preferably an acetyl group.

Readily available starting materials for the method of the invention are adrenosterone and 1-dehydro-adrenosterone. The 1-methyl-11-oxo-estrone, as well as the corresponding 3-acylates, can be prepared by the known dienone-phenol rearrangement from 1-dehydroadrenosterone.

The new method permits the production of new compounds of pharmacological interest. The new steroids of the estrane series still have only a very slight estrogenic activity which is even less than that of the corresponding 1-methyl-11-oxo-estrone derivatives. Nevertheless, both upon oral and upon parenteral administration, they intensively influence the lipid level of the blood. On the tests on cockerels, the content of total unsaponifiable serum lipids is, for example, decreased. This reduction of the lipid level relates not only to the entire serum cholesterol, but also to the triglycerides of the serum. Furthermore, the formation of the macroscopically visible atheromatous changes which can be produced experimentally on cockerels is prevented by these steroids. The compounds of the estrone series produced by the method of the invention are thus suitable for combating arteriosclerosis, i.e., atherosclerosis.

The new steroids of the testosterone series exhibit excellent anabolic action with only slight androgenic activity and, furthermore, have a good anti-hormone action.

The compounds obtained by the method of the invention can be worked by the customary methods into all pharmaceutical forms of preparation. The customary dosage units can be produced therefrom, such as pills, tablets, dragees, emulsions, solutions or injection solutions, which, in general, contain 1 to 200 mg. of the active principle, depending on the indications.

The following are examples in accordance with the invention:

*Example 1*

(a) 50 grams of 1-dehydro-adrenosterone are dissolved in 2 liters of acetic anhydride and treated with 30 grams of perchloric acid. The reaction mixture is set aside 7 hours at room temperatures, and thereupon poured into 15 liters of water, stirred vigorously for 15 minutes, and extracted with chloroform. The chloroform extract is washed free of acid with ice-cold 5% sodium hydroxide ($H_2O$ sol'n) and then washed neutral with water. The chloroform is removed by evaporation. The residue is dissolved several times in methanol to remove the remaining acetic anhydride; the mixture of methanol and the methyl acetate thereby formed is distilled off under reduced pressure. The crude product thus obtained is extracted in ether, the main quantity of the 1,17β-dimethyl-18-nor - 1,3,5(10),12-estratetraene - 3,17α-diol-11-one-diacetate crystallizing out. The crystals which are still brown are filtered in chloroform over 20 times the quantity of Florisil (finely divided magnesium silicate) and recrystallized from ether or acetone.

M.P. 299° C., $(\alpha)_D^{27}$:−49° (chloroform), $\lambda_{max}$ 244 m$\mu$, $E_{1cm}^{1\%}$ 601 (ethanol).

From analysis, it is found that 2 acetyl groups are present in the molecule.

(b) 2 grams of 1,17β-dimethyl-18-nor-1,3,5(10),12-estratetraene-3,17α-diol-11-one-diacetate and dissolved in 255 cc. of methanol, treated with 1.2 grams of potassium acetate and heated for 6 hours to the boiling point under reflux. Thereupon, the concentration is effected by evaporation under reduced pressure to one-third the volume, followed by pouring into 400 cc. of water and extraction with chloroform. The extract is dried with sodium sulfate and evaporated to dryness. The residue is recrystallized from ether and there is obtained pure 1,17β-dimethyl-18-nor-1,3,5(10),12-estratetraene-3,17α-diol - 11 - one-17-acetate.

M.P. 175–180° C., $\lambda_{max.}$ 253 m$\mu$, $E_{1cm}^{1\%}$ 645 (ethanol), $(\alpha)_D^{25}$−83° (chloroform).

(c) The mother liquor obtained upon the crystallization of the 1,17β-dimethyl-18-nor-1,3,5(10),12-estratetraene-3,17α-diol-11-one-diacetate is concentrated to dryness and chomatographed in benzene on Florisil, 5 times the quantity of Florisil being used as employed in Example 1a. The elutate obtained with benzene contains the 12-acetyl-1,17β-dimethyl - 18 - nor - 1,3,5(10),12 - estratetraene-3,17α-diol-11-one-diacetate, which is recrystallized from methanol.

M.P. 178–180° C., $(\alpha)_D^{24}$: —68° (chloroform), $\lambda_{max.}$ 243 –244 mμ, $E_{1\,cm.}^{1\%}$ 573 (ethanol).

From the analysis, it is found that 3-acetyl groups are present in the molecule. The nuclear resonance spectrum shows lines at τ=3.28; 7.65; 7.70; 7.78; 8.06 and 8.92. The infrared spectrum has characteristic bands at 1755 cm.$^{-1}$ (acetyl band); 1660 cm.$^{-1}$ (conjugated carbonyl group); 1600 cm.$^{-1}$ (aromatic system and 1730 cm.$^{-1}$.

The steroid obtained in this manner can be converted by saponification in a manner similar to Example 1b into 12-acetyl-1,17β-dimethyl-18-nor - 1,3,5(10),12 - estratetraene-3,17α-diol-11-one-17-acetate.

By thereupon eluting the column with chloroform, an additional quantity can be obtained of the 1,17β-dimethyl-18-nor-1,3,5(10),12-estratetraene-3,17α - diol - 11 - one-diacetate obtained in accordance with Example 1a.

Example 2

20 grams of 1-methyl-11-oxo-estrone-3-acetate are dissolved in 800 cc. of acetic anhydride and treated with 12 grams of perchloric acid. The mixture is allowed to react for 7 hours at room temperature and the reaction mixture is then worked up in the same manner as in Example 1. The crude product is chromatographed directly on 20 times the quantity of Florisil. From the eluate obtained with benzene, there is obtained, after evaporation of the benzene and recrystallization of the resultant residue from methanol, 12 - acetyl - 1,17β - di-methyl-18-nor - 1,3,5(10),12 - estratetraene - 3,17α - diol-11-one-diacetate of a melting point of 178 to 180° C. The eluate obtained with chloroform, after evaporation of the chloroform and recrystallization of the residue thereby obtained from ether gives 1,17β-dimethyl-18-nor-1,3,5(10),12 - estratetraene - 3,17α-dial-11-one-diacetate of a melting point of 299° C. Both substances are identical in all properties to the substances obtained in accordance with Examples 1a and c.

Example 3

10 grams of 12 - acetyl - 1,17β - dimethyl - 18 - nor-1,3,5(10),12-estratetraene-3,17α-diol-11-one-diacetate of a melting point of 178 to 180° C. are set aside at room temperature for 6 hours in 400 cc. of acetic anhydride with 4.6 cc. of perchloric acid. After the reaction mixture has been worked up in the manner described in Example 1a, the reaction product is chromatographed on 150 grams of Florisil. The starting material is eluted with benzene. Thereupon elution is effected with chloroform and the solution obtained thereby is evaporated to dryness. The residue is recrystallized from ether. The 1,17β-dimethyl-18-nor-1,3,5(10),12 - estratetraene -3,17α-diol-11-one-diacetate obtained having a melting point of 297° C. is identical to the product obtained in accordance with Example 1a.

Example 4

By the method analogous to that of Example 2, the 2-methoxy-11-oxo-estrone-3-methylether is converted into 17β-methyl-18-nor - 1,3,5(10),12 - estratetraene - 11 - one-2,3,17α-triol-2,3-dimethylether-17-acetate and 12-acetyl-17β-methyl - 18 - nor-1,3,5(10),12-estratetraene - 11 - one-2,3,17α-triol-2,3-dimethyl-ether-17-acetate.

Example 5

By the method analogous to that of Example 1, but using propionic acid anhydride instead of acetic anhydride, the 9α-fluoro-16α-methyl - 1,4 - androstadiene-3,11,17-trione is converted into 9α-fluoro-1,16α,17β-trimethyl-18-nor-1,3,5(10),12-estratetraene - 11 - one-3,17α-diol-di-propionate and 9α-fluoro - 12 - propionyl - 1,16α,17β-trimethyl-18-nor - 1,3,5(10),12 - estratetraene-11-one-3,17α-diol-diapropionate.

Example 6

By the method analogous to that of Example 2, the 6α-fluoro-11-oxo-estrone is converted into 6α-fluoro-17β-methyl-18-nor - 1,3,5(10),12 - estratetraene - 11 - one-3,17α-diol-diacetate and 6α-fluoro-12-acetyl - 17α - methyl-18-nor-1,3,5(10),12-estratetraene - 11 - one-3,17α-diol-diacetate.

Example 7

By the method analogous to that of Example 2, the 11-oxo-16α-chloro - estrone - 3 - methylether is converted into 16α-chloro - 17β - methyl - 18 - nor-1,3,5(10),12-estratetraene - 11 - one - 3,17α - diol-3-methylether-17-acetate and 12-acetyl-16α-chloro - 17β - methyl-18-nor-1,3,4(10),12 - estratetraene - 11 - one - 3,17α - diol - 3-methylether-17-acetate.

Example 8

By the method analogous to that of Example 2, but using butyric acid anhydride instead of acetic acid anhydride, the 1-methyl-11-oxo-estrone-3-butyrate is converted into 1,17β-dimethyl-18-nor-1,3,5(10),12-estratetraene-3,17α-diol-11-one-dibutyrate and 12-butyryl-1,17-β-dimethyl - 18 - nor - 1,3,5(10), 12 estratetraene-3,17α-diol-11-one-dibutyrate.

Example 9

By the method analogous to that of Example 2, the 11-oxo-estrone-3-butylether is converted into 17β-methyl-18-nor-1,3,5(10),12-estratetraene - 11 - one-3,17α-diol-3-butylether-17-acetate and 12-acetyl-17β-methyl-18-nor-1,3,5(10),12-estratetraene-11-one-3,17α-diol - 3 - butyl-ether-17-acetate.

It will be understood that the foregoing description of the invention and the examples set forth are merely illustrative of the principles thereof. Accordingly, the appended claims are to be construed as defining the invention within the spirit and scope thereof.

I claim:

1. A compound having the formula:

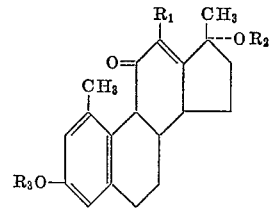

wherein:

$R_1$ designates a member of the group consisting of hydrogen and $R_2$, $R_2$ designates the acyl radical of an aliphatic carboxylic acid having up to 4 carbon atoms, $R_3$ designates a member of the group consisting of hydrogen, an alkyl radical having up to 4 carbon atoms and $R_2$.

2. 1,17β-dimethyl-18-nor - 1,3,5(10),12 - estratetraene-3,17α-diol-11-one-diacetate.

3. 1,17β-dimethyl - 18 - nor-1,3,5(10),12-estratetraene-3,17α-diol-11-one-17-acetate.

4. 12-acetyl-1,17β-dimethyl-18-nor - 1,3,5(10),12-estratetraene-3,17α-diol-11-one-diacetate.

5. 12-acetyl - 1,17β-dimethyl - 18 - nor-1,3,5(10),12-estratetraene-3,17α-diol-11-one-17-acetate.

6. Method of producing α,β-unsaturated keto-steroids which comprises subjecting a 13β-methyl-11,17 - diketo-steroid selected from the group consisting of the androstane and estrane series to the action of a lower alkanoic acid anhydride having from 3 to 8 carbon atoms, said anhydride containing about 0.1 to 5% of a strong acid, thereby to form the 17β-methyl-17α-alkanoyloxy-11-keto-12-ene-steroid and the corresponding 17β-methyl-17α-alkanoyloxy-12-alkanoyl-11-keto-12-ene-steroid, the acyl radicals of said formed steroid being the alkanoyl radical of the said anhydride.

7. The method which comprises subjecting the 12-alkanoyl-steroid defined in claim 6 to the action of the carboxylic acid anhydride containing the strong acid as defined in claim 6, thereby to convert said 12-alkanoyl-steroid into the 17β-methyl-17α-alkanoyloxy-11-keto-12-ene-steroid defined in claim 6.

8. Method in accordance with claim 6 wherein the starting material is 1-dehydro-adrenosterone.

9. Method in accordance with claim 6 wherein the starting material is 1-methyl-11-oxo-estrone.

10. Method in accordance with claim 6 wherein the starting material is a 3-alkylether of 1-methyl-11-oxo estrone.

11. Method in accordance with claim 6 wherein the starting material is a 3-acylate of 1-methyl-11-oxo-estrone.

12. Method in accordance with claim 6 wherein the strong acid is perchloric acid.

13. Method in accordance with claim 6 wherein the strong acid is perchloric acid present in an amount of 0.5 to 1.5%.

References Cited in the file of this patent

"Johns": Journal of Organic Chemistry, vol. 26, November 1961, p. 4584 relied on.